(12) United States Patent  
Takei

(10) Patent No.: US 8,542,091 B2  
(45) Date of Patent: Sep. 24, 2013

(54) CONTROL OF TRANSMITTER PEAK POWER AND DUTY RATIO IN A WIRELESS SYSTEM TO MAINTAIN AVERAGE TRANSMITTER POWER AND INCREASE COMMUNICATION RANGE

(75) Inventor: Ken Takei, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 870 days.

(21) Appl. No.: 12/108,505

(22) Filed: Apr. 23, 2008

(65) Prior Publication Data

US 2008/0266060 A1  Oct. 30, 2008

(30) Foreign Application Priority Data

Apr. 26, 2007  (JP) ................................. 2007-117510

(51) Int. Cl.
 *G08C 19/22* (2006.01)
 *H04Q 9/14* (2006.01)
(52) U.S. Cl.
 USPC .... 340/5.61; 340/10.1; 340/14.66; 340/572.7
(58) Field of Classification Search
 USPC .................. 340/10.1, 10.3, 10.34, 10.4, 10.5, 340/12.16, 12.17, 12.51, 14.6, 14.66, 561, 340/572.1, 572.4, 572.7, 567, 5.6, 5.61, 5.64
 See application file for complete search history.

(56) References Cited

U.S. PATENT DOCUMENTS

| | | | | |
|---|---|---|---|---|
| 4,194,154 A | * | 3/1980 | Kahn | 455/114.1 |
| 5,260,701 A | * | 11/1993 | Guern et al. | 340/10.34 |
| 6,141,393 A | * | 10/2000 | Thomas et al. | 375/347 |
| 6,590,542 B1 | * | 7/2003 | Briggs | 343/742 |
| 6,707,376 B1 | * | 3/2004 | Patterson et al. | 340/10.3 |
| 7,317,378 B2 | * | 1/2008 | Jarvis et al. | 340/10.1 |
| 8,026,793 B2 | * | 9/2011 | Luo et al. | 340/5.72 |
| 8,233,861 B1 | * | 7/2012 | Cripe et al. | 455/129 |
| 2003/0112193 A1 | | 6/2003 | Briggs | |

(Continued)

FOREIGN PATENT DOCUMENTS

| JP | 2001-024548 | 1/2001 |
|---|---|---|
| JP | 2001-223607 | 8/2001 |

(Continued)

OTHER PUBLICATIONS

Klaus Finkenzeller "Fundamentals and Applications in Contactless IC Cards and Identification" RFID-Handbook, 2$^{nd}$ Japanese Edition, Nikkan Kogyo Shimbun, Ltd., May, 2004, p. 45.

(Continued)

*Primary Examiner* — Steven Lim
*Assistant Examiner* — Stephen Burgdorf
(74) *Attorney, Agent, or Firm* — Miles & Stockbridge P.C.

(57) ABSTRACT

When supplying a power from a base station to a terminal station on radio and a distance from a base station to a terminal station is long, it becomes impossible for the terminal station to rectify the power. The feature of the present invention is found in a wireless communication system in which the peak value and duty ratio of a transmission power are controlled simultaneously, keeping the transmission power of a base station below a fixed value, thereby allowing a voltage to be applied to a diode, which is a component of a rectifier circuit possessed by a terminal station, always in excess of a threshold voltage of the diode, and energy is exchanged between the base station and the terminal station below a limit power.

9 Claims, 19 Drawing Sheets

(56) References Cited

U.S. PATENT DOCUMENTS

| | | | |
|---|---|---|---|
| 2004/0005863 A1* | 1/2004 | Carrender | 455/41.1 |
| 2005/0040232 A1* | 2/2005 | Maloney | 235/385 |
| 2006/0038658 A1 | 2/2006 | Jarvis et al. | |
| 2006/0145853 A1* | 7/2006 | Richards et al. | 340/572.1 |
| 2006/0199620 A1* | 9/2006 | Greene et al. | 455/572 |
| 2007/0018793 A1* | 1/2007 | Stewart et al. | 340/10.3 |
| 2007/0081585 A1* | 4/2007 | Suematsu et al. | 375/239 |
| 2007/0149162 A1* | 6/2007 | Greene et al. | 455/343.1 |
| 2007/0160165 A1* | 7/2007 | Morgan | 375/299 |
| 2007/0222608 A1* | 9/2007 | Maniwa | 340/572.7 |
| 2007/0290802 A1* | 12/2007 | Batra et al. | 340/10.1 |
| 2010/0156600 A1* | 6/2010 | Duron et al. | 340/10.1 |

FOREIGN PATENT DOCUMENTS

| | | |
|---|---|---|
| JP | 2004-128635 | 4/2004 |
| JP | 2005039396 A * | 2/2005 |
| JP | 2006-350636 | 12/2006 |
| WO | WO 99/66429 A1 | 12/1999 |
| WO | WO 2005/069503 A1 * | 7/2005 |

OTHER PUBLICATIONS

Office Action from Japanese Patent Application No. 2007-117510 (and English translation).

Klaus Finkenzeller "Fundamentals and Applications in Contactless IC Cards and Identification" RFID-Handbook, 2nd Japanese Edition, Nikkan Kogyo Shimbun, Ltd., May, 2004, pp. 38-39.

* cited by examiner (a)　　　　　　　　　　　(b)

$\tau/T=1$ $\tau/T=0.5$ $\tau/T=0.25$

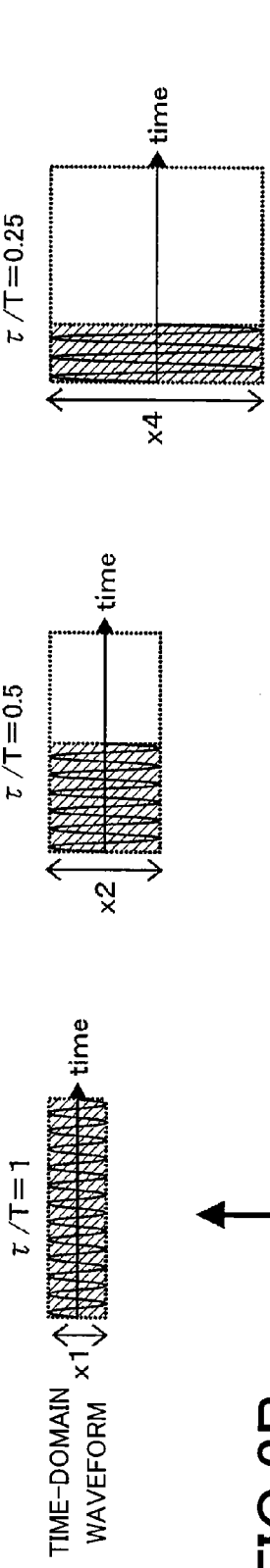
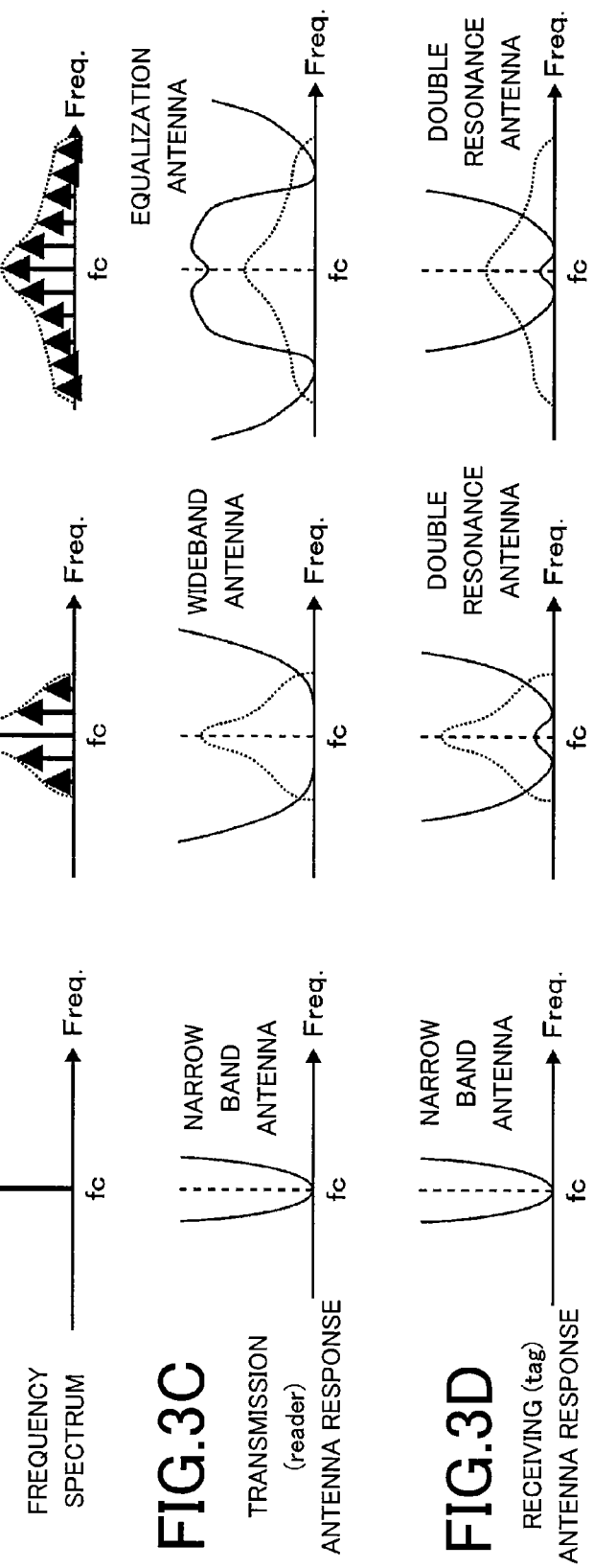
FIG.3A FIG.3B FIG.3C FIG.3D (b)

(a)

(b)

(a)

CONTROL OF TRANSMITTER PEAK POWER AND DUTY RATIO IN A WIRELESS SYSTEM TO MAINTAIN AVERAGE TRANSMITTER POWER AND INCREASE COMMUNICATION RANGE

CLAIM OF PRIORITY

The present application claims priority from Japanese application JP 2007-117510 filed on Apr. 26, 2007, the content of which is hereby incorporated by reference into this application.

FIELD OF THE INVENTION

The present invention relates to a transmitter and a wireless system using the same, especially, to a transmitter suitable to an RFID wireless system for example, and a wireless system using the transmitter, in which an electromagnetic wave transmitted by a base station is scattered on an unspecified object or a terminal station, and arrives at the base station again, subsequently the base station receives this arrival electromagnetic wave, and identifies information proper to the object or the terminal station.

BACKGROUND OF THE INVENTION

In a wireless system which uses a scattered wave as a direct carrier, the conventional technology which may be called direction division duplex (DDD) is known. In this technology, a transmitted wave and a received wave are treated equivalently as duplex, using the difference in the directivity of an outgoing electromagnetic wave from a base station and an incoming electromagnetic wave to the base station with the help of a circulator. This technology is described in "RFID-Handbook, 2nd Japanese edition", written by Klaus Finkenzeller, translated by Software Engineering Laboratory, published by Nikkan kogyo Shimbun, Ltd. May, 2004, p. 45.

SUMMARY OF THE INVENTION

The usefulness of the technology of identifying many unspecified objects remotely is expected greatly in recent years with the quantitative increase of a physical distribution and the increasing speed of circulation. In order to identify an object in large quantities and at high speed, it is indispensable to apply information transmission means which penetrates the object, because the spatial relationship of plural objects in the remote distance cannot be identified. To such a use, the wireless technology is suitable. In particular, detection of an object using electromagnetic waves, and transfer of the information which the object possesses are already practically utilized as a wireless tag system, for example.

However, with an increase in the speed and capacity of the physical distribution, it is a universal society demand to enhance the capability of object detection and the information transmission capacity using electromagnetic waves, in other words, to improve the distance which electromagnetic waves will reach in a wireless system. Electromagnetic waves decrease with a transmission distance, in proportion to about the 2nd to 3rd power of the distance. Therefore, when the transmission distance increases, the electromagnetic waves radiated from a base station are reflected by an object and arrive at the base station again with remarkably decreased power. Consequently, the arrival electromagnetic waves will possess a very low tolerance property against various disturbing factors.

In such a system, a common method is to use, as a carrier for information transmission, the electromagnetic scattered field from the object to be identified, in order that the energy of the electromagnetic waves which arrive from the base station is reradiated to the base station with a conversion loss as small as possible. In order to generate a new carrier by certain means, it will be necessary to convert the high-frequency power of electromagnetic waves into an electric source power for the certain means. Actually, the conversion will be certainly accompanied with a conversion loss. In the radio transmission using electromagnetic waves, the range of electromagnetic waves will be restricted by the power to be given to a carrier. Therefore, to make the power efficiency of carrier generation maximum leads to maximizing the range of the electromagnetic waves in the system, in other words, to maximizing the application limit of the system.

For example, in an RFID system, some application requires a communication range of 10 m class. When a conversion loss is taken into consideration in the system used for such an application, it is desirable to provide a base station and a terminal station with several 10 m class of communication capability. On the other hand, the usable maximum transmission power is specified to about several watts or less by law etc. of each country and region, and hence, it is necessary to control the average transmission power below the specified value. With the transmission power below such specified value, many difficulties will be met in extending the communication range.

The system which uses a scattered wave as a direct carrier is disclosed in "RFID-Handbook, 2nd Japanese edition", written by Klaus Finkenzeller, translated by Software Engineering Laboratory, published by Nikkan kogyo Shimbun, Ltd. May, 2004, p. 45 as described above. FIG. 16 is a rewrite of FIG. 8 to 21 of "RFID-Handbook, 2nd Japanese edition", illustrating a circulator 86 used as a directional coupler. The output of a carrier generator 84, which is a source of the electromagnetic wave radiated from a base station 80, is fed to the circulator and radiated from an antenna 87. The electromagnetic wave 881 radiated from the base station 80 arrives at a terminal station 90. The energy of that electromagnetic wave is taken in by an antenna 97 possessed by the terminal station 90, and is converted into a DC power supply in a rectifier circuit 94. Modulation is performed to the load impedance of the antenna 97 with a modulation circuit 93 using the DC power supply. This action results in radiating an electromagnetic wave 982 which is obtained by modulating the amplitude of the electromagnetic wave 881. In the base station 80, the electromagnetic wave returned is led to the circulator 86 from the antenna 87. Because of the non-reciprocity of the circulator, the electromagnetic wave is fed to a receiving circuit 85, not to the carrier generator 84.

In the method of "RFID-Handbook, 2nd Japanese edition", the base station distinguishes the transmitted wave and the received wave based on the fact that the electromagnetic waves passing the circulator in opposite directions are mutually independent. Accordingly, the fact means that electromagnetic waves utilize a radiation field. Although the radiation field can transmit a power to a distance compared with other two fields, that is, an induction field and a near field, it is desirable that the size of an antenna which transmits and receives the energy of electromagnetic waves should be comparable to a wavelength, requiring a large antenna.

The transmission power radiated from the base station propagates a wireless space with decreasing energy, and reaches a terminal station. The terminal station takes in the arrived transmission power to the inside of the terminal station via an antenna, and converts it through a rectifier circuit into a power source to drive electric and electronic circuits which are the components of the terminal station. The main component of the rectifier circuit is a diode. A diode has a threshold voltage arising from intrinsic physical properties, and performs rectifying operation only when the voltage applied to the diode exceeds this threshold voltage. When the distance between the base station and the terminal station increases with decreasing the transmission power which reaches the terminal station from the base station, the peak value of a voltage applied to the diode is decreased. When the peak value of the voltage becomes below the threshold voltage of the diode, the transmission power will not be converted into the power source, leading to the fact that the power supply to the electric and electronic circuits which are the components of the terminal station will no longer be made. Consequently, communication between the base station and the terminal station becomes impossible. In other words, the greatest technical problem of the conventional system is that the power transfer efficiency from a power sending station to a power receiving station is very low (about 10%), and especially that the efficiency of a rectifier circuit of the high-frequency power transmitted by electromagnetic waves is low (<20%).

In this way, in the wireless communication system based on the conventional technology which transfers a power using an electromagnetic wave signal transmitted by a base station, the power transfer efficiency from the base station to the terminal station is poor, and the communication range, that is, the service area of the wireless communication system will be restricted. This fact causes a problem.

The present invention has been made in view of the above circumstances and provides a transmitter and a wireless communication system using the same, to improve the power transfer efficiency from a base station to a terminal station, and to expand the communication range between the base station and the terminal station with a power below a limited value.

The following is one of the typical examples of the present invention. That is, a transmitter for a wireless system according to one embodiment of the present invention comprising a unit for performing modulation of a carrier; a unit for generating an output signal possessing an average transmission power not greater than a predetermined value by controlling a peak value and a duty ratio of the modulated carrier simultaneously; and a unit for transmitting the generated output signal.

According to one embodiment of the present invention, the power transfer efficiency from a base station to a terminal station improves, and a communication range between the base station and the terminal station can be expanded with a power below a limit value. Therefore, it is effective in expanding the service area of the wireless communication system which uses the base station and the terminal station as the components of the system.

BRIEF DESCRIPTION OF THE DRAWINGS

FIGS. 3A-3D are charts illustrating a relationship between a time-domain waveform and a frequency spectrum in a base-station transmitting power, and an example of a desirable frequency spectrum of an antenna, in the wireless system according to the first embodiment;

DETAILED DESCRIPTION OF THE PREFERRED EMBODIMENTS

Figure 1A:
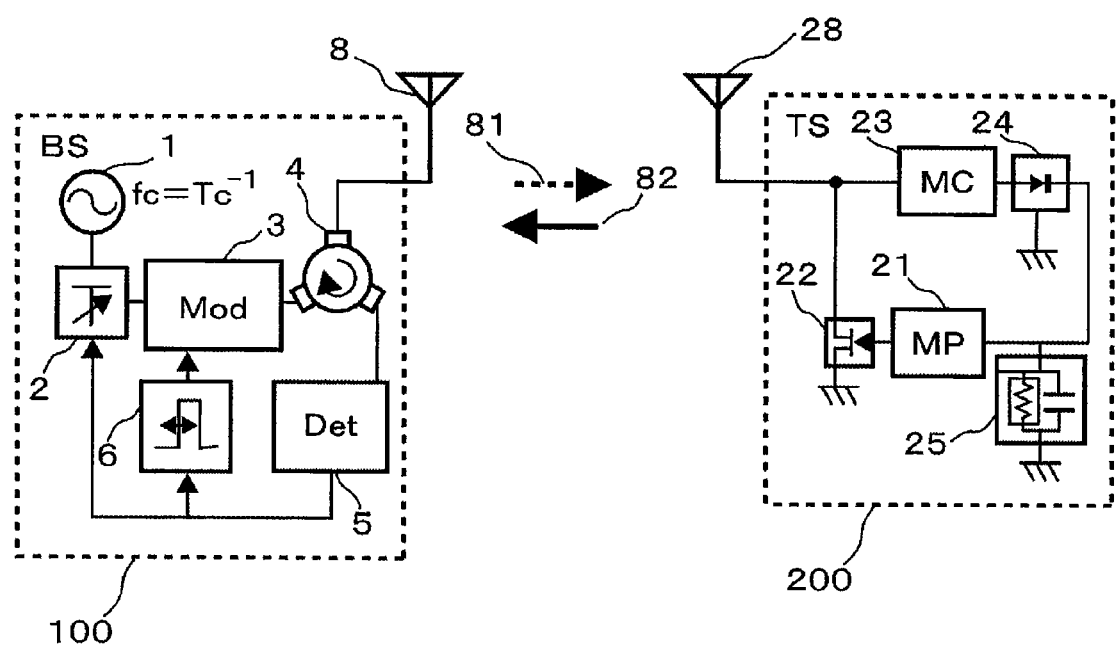
FIG. 1A is a block diagram illustrating constitution of a wireless system according to a first embodiment of the present invention.

According to the typical embodiment of the present invention, the wireless communication system controls simultaneously the peak value and duty ratio of a transmission power, keeping the transmission power of the base station at below a fixed value, and performs transmission of energy between the base station and the terminal station within a limit power, by applying always to a diode, which is a component of a rectifier circuit possessed by the terminal station, a voltage greater than the threshold voltage of the diode.

The simplest method of increasing the peak value of the electromagnetic waves which arrive at a terminal station from a base station is to increase the transmission output of the base station. However, a wireless system uses generally a free space, that is an open waveguide, as the transmission line, and it is essentially difficult to control the interference with other wireless systems. Therefore, the maximum transmission output power which each wireless system is allowed is restricted strictly. Accordingly, with keeping a transmission power constant and switching on and off intermittently the transmission output in a suitable period (at a fixed duty ratio), it becomes possible to increase the peak value of the electromagnetic lo waves which reach the terminal station, keeping constant the transmission power which is specified by a time average. Accordingly, it becomes possible in principle to provide a voltage exceeding a threshold to a diode which is a component of the rectifier circuit of the terminal station. As a result, the power transfer efficiency from the base station to the terminal station improves.

A transmission power is radiated to a wireless space via an antenna, which generally exhibits an intrinsic frequency characteristic. The transmission power intermittently transmitted at a fixed duty ratio with a constant power possesses a frequency spectrum in which the power centers on a certain frequency (center frequency) and decreases as the frequency gets away from the center frequency. Accordingly, in order to reproduce a faithful form (time-domain waveform) of the electromagnetic waves transmitted intermittently at the terminal station, it is necessary to use a wideband antenna for a base-station antenna and a terminal-station antenna. A wideband antenna requires a sufficiently large size compared with a wavelength (generally larger than 3 to 5 wavelengths). Although the technique of loading resistance in some part of the antenna to realize a wideband antenna is known, in this case, the antenna bears a loss of 3 dB automatically, and the efficient transfer of power from a base station to a terminal station is unrealizable, against the purpose of the present invention. In an RFID system, it is generally necessary to stick terminal stations on plural objects to be managed, and the terminal station has a limitation that the size must be miniaturized for its use, and application of a wideband antenna is very difficult as a matter of fact.

In order to solve this problem, it is desirable to adopt as the terminal-station antenna a miniaturized antenna of a single resonance or a double resonance which is realizable with the usual miniaturized antenna, and as the base-station antenna which is less tight in the limitation of antenna size, to adopt an antenna which possesses an equalization function with the frequency characteristic to compensate the frequency characteristic of the miniaturized terminal-station antenna.

Hereinafter, the embodiments of the present invention are described in detail.

First Embodiment

A first embodiment of the present invention is described with reference to FIGS. 1A to 1D. FIG. 1A is a block diagram illustrating constitution of a wireless system according to the first embodiment of the present invention. A base station 100 includes a carrier generation circuit 1, a variable attenuator 2, a modulation circuit 3, a circulator 4, a sideband wave detector circuit 5, a duty variable circuit 6, and a base-station antenna 8. A terminal station 200 includes a switch 22, a matching circuit 23, a rectifier circuit 24, a smoothing circuit 25, a micro-processor 21, and a terminal-station antenna 28. Electromagnetic waves which propagate space are used for the communication media between the base station and the terminal station, and intermittent transmission is performed between the base station and the terminal station.

In the base station 100, a carrier signal of frequency fc is generated by the carrier generation circuit 1 which possesses an oscillator. The carrier signal generated is inputted into the modulation circuit 3 via the variable attenuator 2. In the modulation circuit 3, a predetermined modulation is performed to the inputted carrier signal wave. For example, amplitude modulation is performed by the modulating signal of frequency fp. This amplitude modulation is a digital modulation in which the on/off control of the carrier is performed by the modulating signal, for example. Digital modulation systems such as phase modulation or others may be used instead. The output of the modulation circuit 3 is coupled to the first port of the circulator 4, and the base-station antenna 8 is coupled to the second port of the circulator 4. The input terminal of the sideband wave detector circuit 5 is coupled to the third port of the circulator 4. As a concrete application of the present wireless system, the terminal station 200 is an RFID tag and the base station 100 is an RFID tag reader. The frequency fc is in the range of 300 MHz to 3 GHz, more preferably in the range of 800 MHz to 900 MHz.

The base station 100 is provided with a function to change the peak value of the output of the carrier generation circuit 1 by the variable attenuator 2 and a function to change the duty ratio (time width of intermittent output) of the output by the duty variable circuit 6. The base station 100 controls to limit the duty ratio of the output wave in correspondence with the peak value, so that the average transmission output of the modulated carrier signal which is outputted from the modulator 3 to the circulator 4 may not exceed a predetermined value. That is, in the base station 100, based on the output of the sideband wave detector circuit 5, the magnitude of attenuation set by the variable attenuator 2 and the duty ratio set by the duty variable circuit 6 are controlled to the digital-modulated carrier signal (on/off signal), respectively, and an output signal 81 is generated.

Figure 1B:
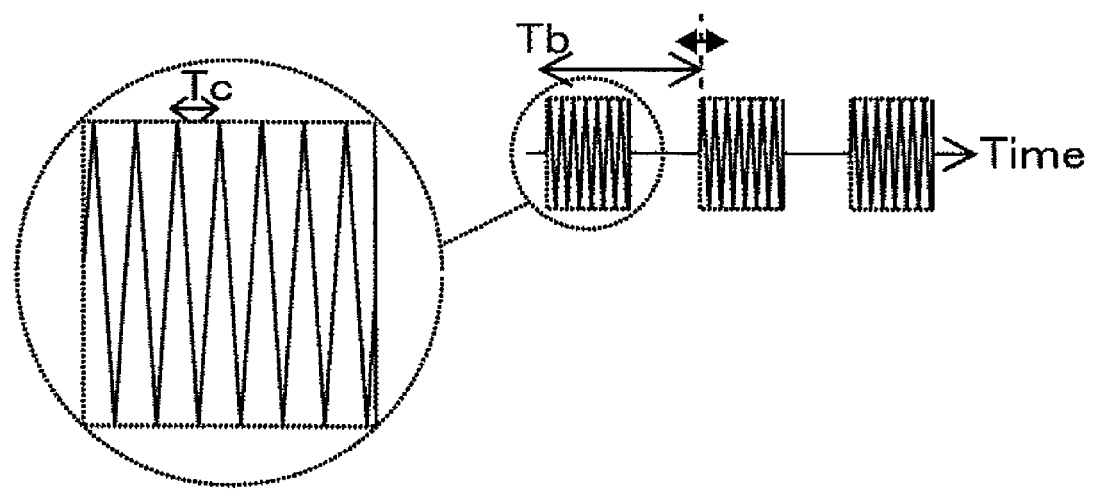
FIG. 1B is a chart illustrating a waveform of an output signal outputted from a base-station antenna according to the first embodiment.

As illustrated in FIG. 1B, the output signal 81 transmitted from the base-station antenna 8 via the circulator 4 is an intermittent carrier wave of a cycle Tc, shaped in on/off pulses of a cycle Tb with a constant-peak on-signal (period=T) and a off-signal when observed on the time axis.

Figure 1C:
FIG. 1C is a chart illustrating frequency spectra of the output signal and the reflected signal in the first embodiment.

On the other hand, on the frequency axis, the output signal 81 exhibits a frequency spectrum which centers on the center frequency fc (=1/Tc) and includes plural sideband waves of frequency interval fb with the power decreasing as getting away from the center frequency, as illustrated in (a) of FIG. 1C.

In the terminal station 200, the terminal-station antenna 28 is coupled in parallel to the switch 22 and the matching circuit 23. The output of the matching circuit 23 is supplied as a power of the micro-processor 21 via the rectifier circuit 24 and the smoothing circuit 25. The rectifier circuit 24 possesses a diode as a rectifying element. The output signal 81 from the base station 100 arrives at the terminal station 200, is taken in to the terminal station 200 from the terminal-station antenna 28, and is applied to the rectifier circuit 24 via the matching circuit 23. When the applied voltage exceeds the threshold voltage of the diode, the applied voltage to the rectifier circuit is rectified, sent to the smoothing circuit 25, and integrated as the power source of the micro-processor 21 etc. The micro-processor is driven by the power. The output signal 81 is sent, via the rectifier circuit 24, also to the micro-processor 21 and demodulated. In response to the output signal 81, the micro-processor 21 controls the modulation performed to the transmission power which is radiated from the base station, in order to generate a reflected wave including the information on the terminal station. This modulation is digital modulation of amplitude modulation, phase modulation, and others. This modulation is performed by the Micro-processor 21, by changing the load impedance of the terminal-station antenna, for example. Therefore, the micro-processor 21 is provided with a CPU and a program, and controls at least on/off of the switch 22 coupled with the terminal-station antenna 28, based on the information beforehand stored in an internal or external memory. Consequently, a new sideband wave spectrum is formed as a reflected wave 82, possessing the spectrum components of a center frequency fc of the transmitted wave 81 and plural sideband wave frequencies of frequency interval fb, as illustrated in (b) of FIG. 1C.

The reflected wave 82 from the terminal station 200 arrives at the base station 100, is taken into the base station 100 from the base-station antenna 8, and is inputted via the circulator 4 into the detector 5 for detecting the sideband waves newly generated by the terminal station. When the new sideband wave component is not detected with detector 5, it means that the distance between the base station and the terminal station exceeds the marginal communication range. The result is outputted to the variable attenuator 2 and the duty variable circuit 6, and the magnitude of attenuation of the digital-modulated carrier signal and the duty ratio (T/T) of the on/off signal are controlled based on the result.

Figure 1D:
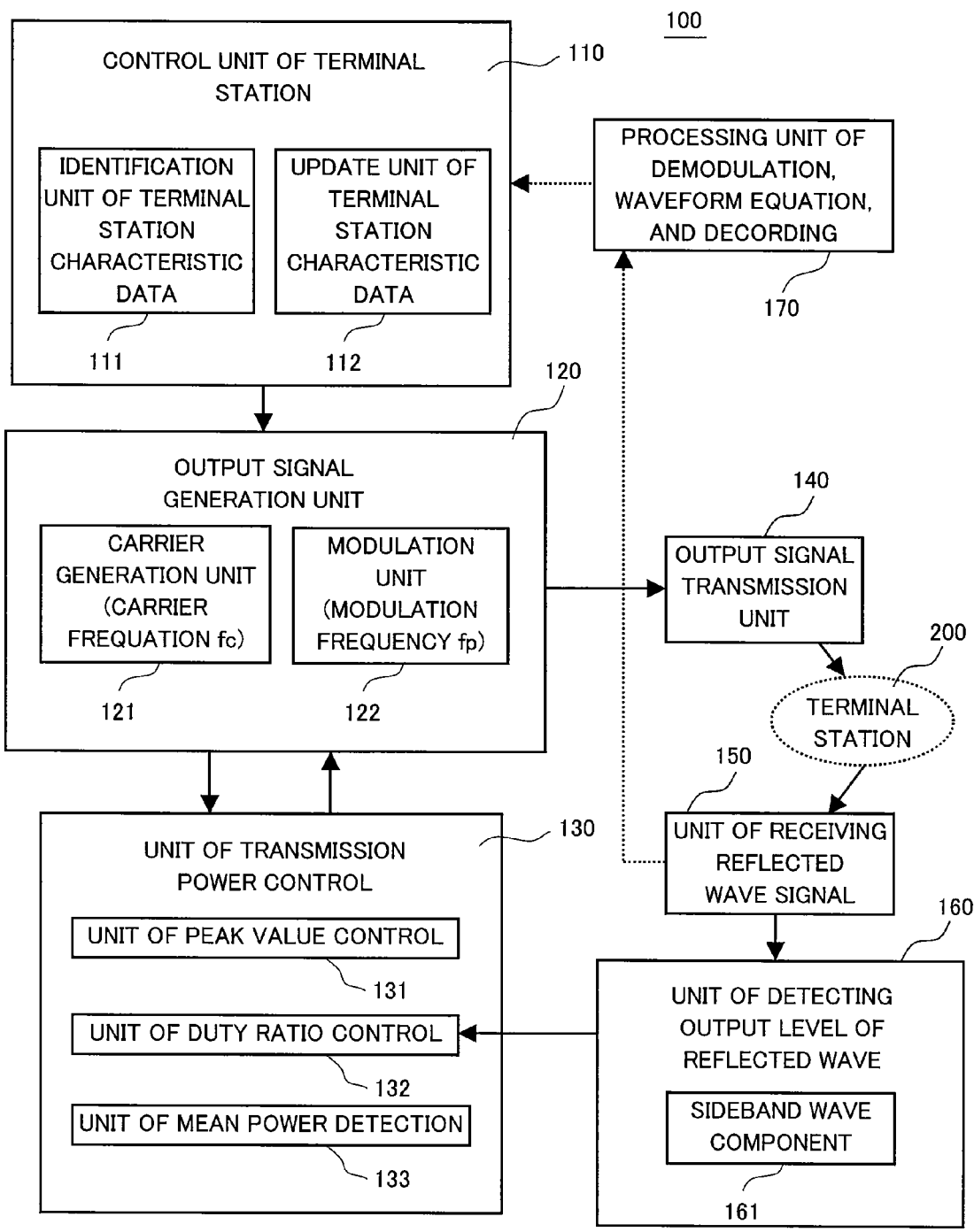
FIG. 1D is a diagram illustrating the constitution of the base station in the first embodiment.

FIG. 1D is a diagram illustrating the constitution of the base station in the first embodiment.

A base station 100 is an RFID tag reader and provided with a terminal station control unit 110 which includes an identification unit 111 for identifying information proper to a terminal station by a modulating signal and an update unit 112 for updating the information on the terminal station.

The base station 100 is provided with an output signal generation unit 120 which includes a carrier generation unit 121 for generating a carrier signal of frequency fc and a modulation unit 122 for imparting a predetermined digital modulation to the carrier signal based on the information of the terminal station control unit 110. The base station 100 is further provided with a unit of transmission power control 130 for controlling the transmission power of the output signal which is a modulated carrier signal. The unit of transmission power control 130 includes a unit of peak value control 131 for controlling the peak value of the digital-modulated carrier signal, a unit of duty ratio control 132 for controlling the duty ratio (τ/T) of the digital-modulated carrier signal, and a unit of mean power detection 133 for detecting whether the average transmission output is below a predetermined value. The base station 100 is also provided with an output signal transmission control unit 140 for outputting an output signal from the base-station antenna 8 via the circulator 4.

Furthermore, the base station 100 is provided with a unit of receiving reflected signal 150 which receives, takes in, and controls the reflected wave from the terminal station, and unit of output level detection 160 which detects the output level of the reflected wave, and a reflected signal processing unit 170 for performing demodulation, waveform equalization, and decoding.

The unit of output level detection 160 for the reflected wave takes in the reflected wave 82 from the terminal station 200, and detects, with the detector 5, a sideband wave component 161 newly generated by the terminal station 200. When the new sideband wave component is not detected, the magnitude of attenuation of the carrier signal and the duty ratio (τ/T) of the on/off signal are controlled by the unit of transmission power control 130.

On the other hand, the terminal station 200 is provided with a receiving function which takes in the transmission power from the base station via the terminal-station antenna, a rectification and supply voltage generation function which rectifies a high-frequency power as the actual aspect of a transmission power by a rectifier circuit, and uses as the power source of the electronic circuitry which is a component of the terminal station, a function realized by the micro-processor 21, and a transmitting function. The function realized by the micro-processor 21 includes a processing function of demodulation, waveform equalization, and decoding, a function to hold and update the characteristic data of the terminal station, a function of reflected wave generation, and a function of a memory, etc.

The micro-processor 21 makes a switch 22 on and off according to the predetermined information held inside, and the load impedance value of the terminal-station antenna 28 changes according to the on/off of the switch 22. In connection with the action, the mean power of the reflected wave 82 from the terminal-station antenna 28 changes as shown in (b) of FIG. 1C.

On the other hand, when the applied voltage to the diode as a component of the rectifier circuit 24 does not exceed the threshold voltage of the diode, a power is not supplied to the micro-processor 21 and the generation of a reflected wave accompanied by the modulation to the received transmission power 81, i.e., the generation of a new spectrum to the frequency spectrum of the transmission power 81 by the terminal station, does not take place.

Figure 2A:
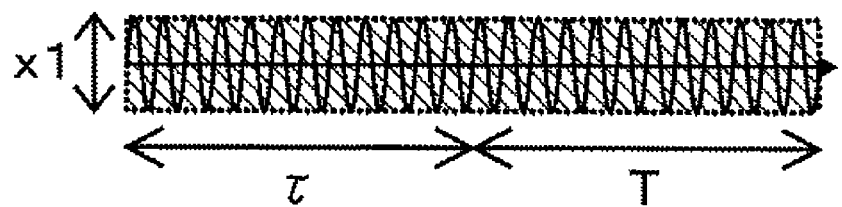
FIGS. 2A-2C are charts each of which illustrating an example of time-domain waveforms of a base-station transmitting power in a wireless system according to the first embodiment.
Figure 2B:
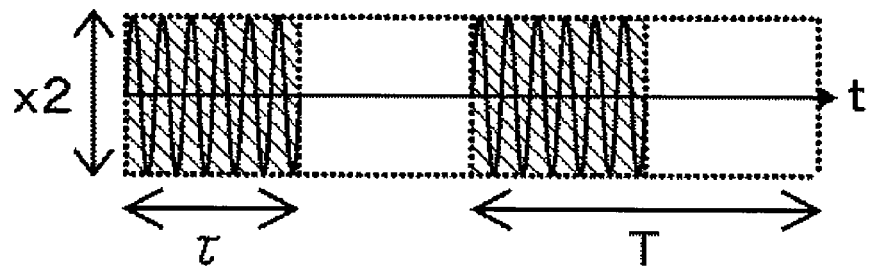
Figure 2C:
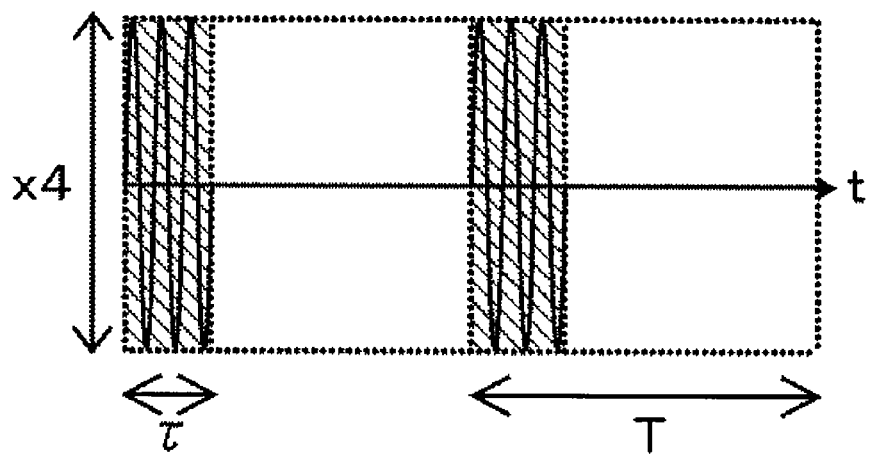

FIGS. 2A-2C are charts each of which illustrates an example of a time-axis waveform (time-domain waveform) of the transmission power 81. The maximum of the transmission power is specified by law etc. in each country and each region. In order to always maintain the average of the transmission power below the specified value for example 1W, in the case of FIG. 2A, the duty ratio (τ/T) of the on-signal (period=T) in the digital-modulated carrier is set 1 and the peak value is also set to 1; in the case of FIG. 2B, the duty ratio (τ/T) is set to 0.5, and the peak value is set to 2; and in the case of FIG. 2C, the duty ratio (τ/T) is set to 0.25, and the peak value is set to 4.

Next, the transfer of power and the waveform equalization are discussed. FIGS. 3A-3D are charts illustrate a relationship of a time-domain waveform (FIG. 3A) and a frequency spectrum (FIG. 3B). In the case that the duty ratio (τ/T) of the on-signal (period=T) is 1, the corresponding frequency spectrum possesses only a center frequency fc. As the duty ratio (τ/T) changes to 0.5 and further to 0.25, the frequency spectrum is formed on the frequency axis centering on the center frequency fc (=1/Tc) and including plural sideband waves of frequency interval fb of which the power decreases as the frequency gets away from the center frequency.

The response curves in FIGS. 3c and 3D illustrate the example of the desirable antenna in the base station 100 and the terminal station 200, corresponding to the frequency spectrum of FIG. 3B. It is suitable for the terminal station to employ the miniaturized antenna of a single resonance or a double resonance, realizable by the usual small-sized antenna. On the other hand, generally the base station has a less tight limitation on an antenna size; therefore, it is suitable for the base station to employ an antenna which possesses the equalization function with the frequency characteristic to compensate the frequency characteristic of the miniaturized antenna of the terminal station.

When the "intermittent ratio" (duty ratio) in the intermittent transmission of electromagnetic waves is especially made too small, the high frequency component of the transmission power will increase and the efficiency of the rectifier circuit will decrease under the influence of the high-frequency parallel capacity of the diode. Therefore, it is desirable for the base station antenna to employ the antenna which possesses the equalization function with the frequency characteristic to compensate the frequency characteristic of the miniaturized antenna of the terminal station. By employing the base station antenna which possesses such a "waveform equalization" function, "waveform equalization intermittent transmission" which is dynamically adaptive for the distance between a sending station and a receiving station can be performed, and improvement in the power transfer efficiency of the wireless system can be made.

Next, operation of the transmission power control of the base station 100 in the present embodiment is explained with reference to FIG. 4A and FIG. 4B.

The reflected wave 82 from the terminal station 200 is taken in to the base station 100, and inputted into the sideband wave detector 5 via the circulator 4. When a new sideband wave component is not detected by the sideband wave detector 5, it means that the distance between the base station and the terminal station exceeds the marginal communication range of the base station and the terminal station when a transmission power is not transmitted intermittently. In that case, a voltage which is applied to the diode as a component of the rectifier circuit possessed by the terminal station is made greater than the threshold voltage of the diode, enabling the information to be exchanged between the base station and the terminal station. To achieve the above, the time-axis peak value of the transmission power transmitted from the base-station antenna 8 is raised. When the mean power exceeds the specified value defined in advance, the time-axis duty ratio of the transmission power is decreased, thereby keeping the average of the transmission power below the predetermined value.

Figure 4A:
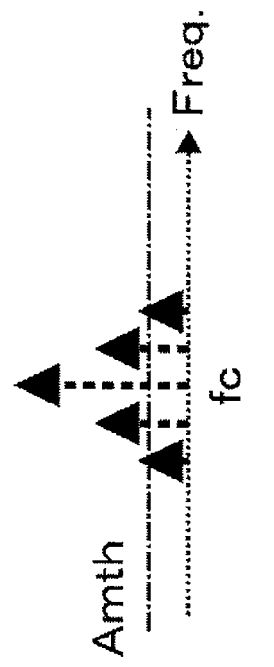
FIG. 4A is an explanatory chart illustrating operation of transmission power control of the base station according to the first embodiment.
Figure 4A:
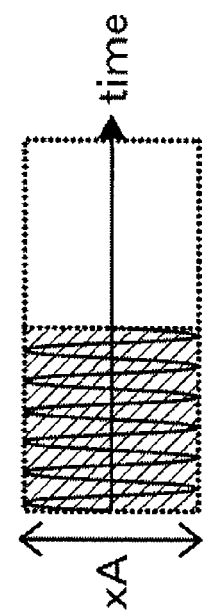
Figure 4B:
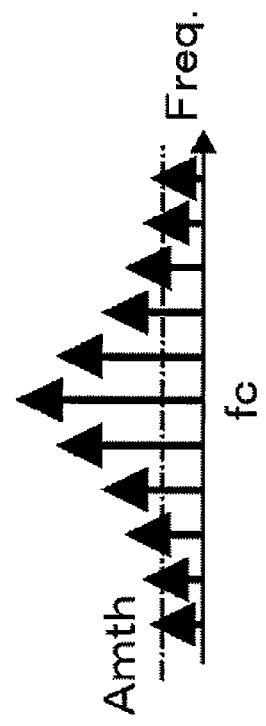
FIG. 4B is an explanatory chart illustrating operation of transmission power control of the base station according to the first embodiment.
Figure 4B:
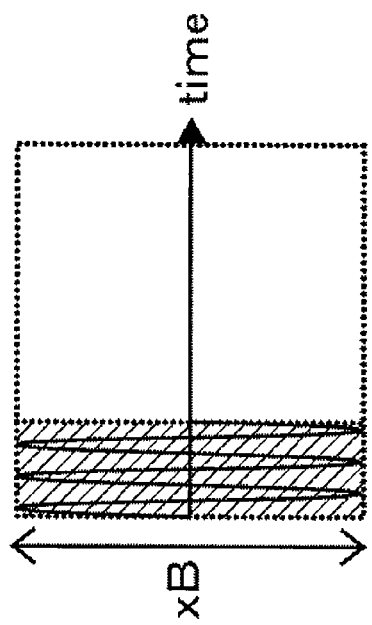

The base station tries to detect, for the output signal of a peak value xA as illustrated in (a) of FIG. 4A, the spectrum which possesses frequency components other than the frequency spectrum fc possessed by the transmission power of the base station, among the frequency spectrum of the electromagnetic waves reradiated from the terminal station. The dashed line of (b) of FIG. 4A indicates the amplitude value Amth corresponding to the threshold of the diode employed for the rectifier circuit of the terminal station. When this spectrum is not detected (when the spectrum is smaller than the amplitude value Amth), the base station increases the peak value of the transmission power to a value xB which is greater than the amplitude value Amth, as illustrated in (a) of FIG. 4B. At the same time, the base station controls to decrease the duty ratio of the intermittent transmission, under the conditions that the transmission power (prescribed average power value) is kept below the predetermined value.

On the contrary, when the spectrum is detected, the base station controls to decrease the peak value of the transmission power, and to increase the duty ratio of intermittent transmission. Namely, the base station controls the peak value and the duty ratio, keeping the transmission power (prescribed average power value) below the predetermined value using the spectrum which possesses frequency components other than the frequency spectrum possessed by the transmission power of the base station, among the frequency spectrum of the electromagnetic waves reradiated from the terminal station. By performing feedback control to the transmission power in this way, it is possible to keep the average of the transmission power below the specified value, securing the communication range.

Any means other than detection of a sideband wave may be employed as means to detect the existence of the electromagnetic waves reradiated from the terminal station of the communication object, as long as what is detected indicates the reradiated electromagnetic waves.

Figure 5:
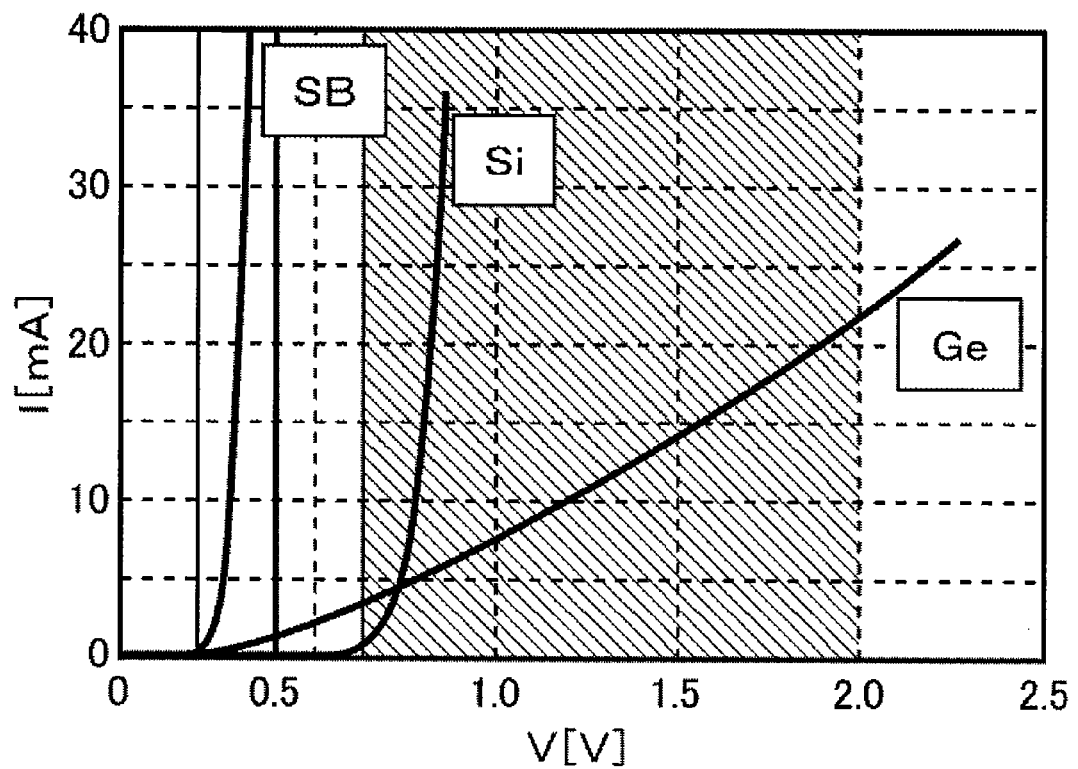
FIG. 5 is a chart illustrating V-I characteristics of a Schottky barrier diode (SB), a silicon diode (Si), and a germanium diode (Ge), usable as a rectifying element of the first embodiment.

Next, the diode employed for the rectifier circuit of the terminal station is discussed. FIG. 5 illustrates the V-I characteristics of a Schottky barrier diode (SB), a silicon diode (Si), and a germanium diode (Ge). The threshold of the germanium diode is about 0.4 v comparable as that of the Schottky barrier diode (SB), and is lower than the threshold of the silicon diode (Si) (about 0.7V). However, the V-I characteristics are gentle and the efficiency as a rectifier circuit is as poor as about 10%. In other words, a Schottky barrier diode possesses a low threshold, steep V-I characteristics, and a high efficiency as a rectifier circuit.

Figure 6:
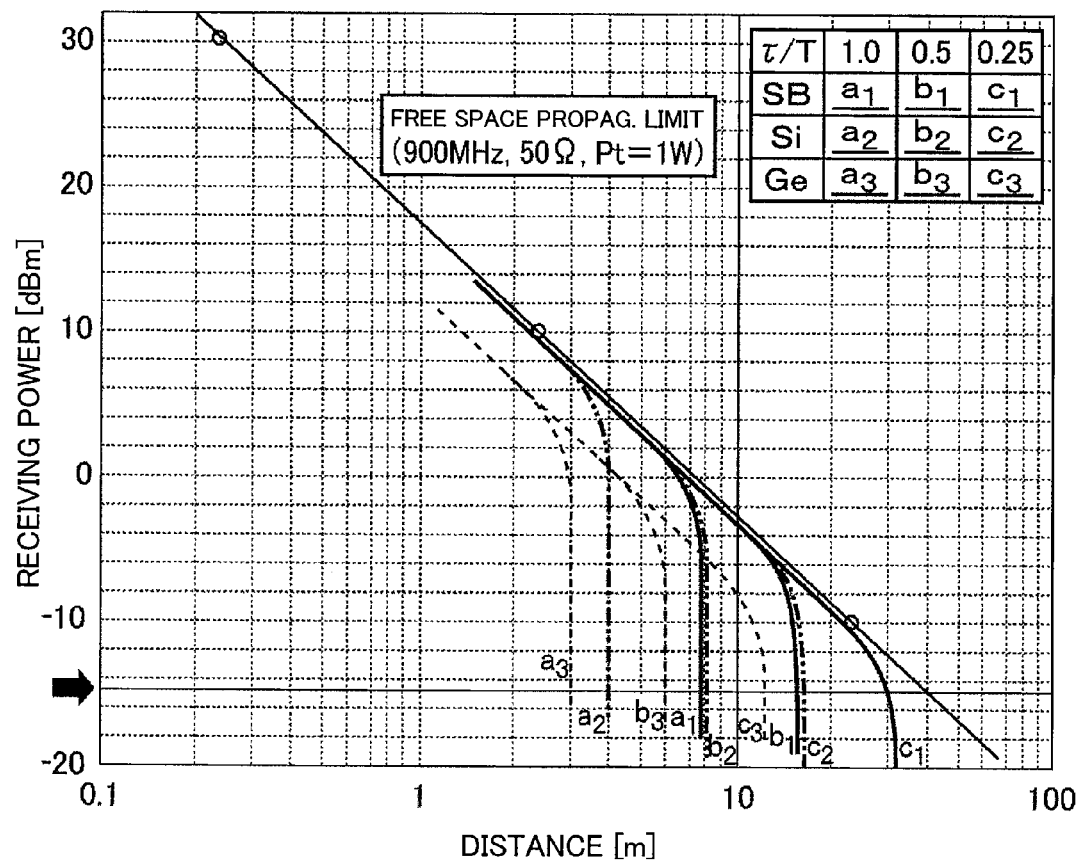
FIG. 6 is a diagram illustrating relationship of a communication range and a receiving power, with a duty ratio alteration as a parameter, when each one of the three kinds of diodes described in FIG. 5 is adopted as a rectifier circuit.

The excellent property of a Schottky barrier diode is maintained also in the case of the intermittent power transmission which performs modulation to a carrier and controls a peak value and a duty ratio at the same time. FIG. 6 illustrates the relationship between the intermittent transmission and the received power. The figure illustrates the relationship of the communication range and the received power, associated with the duty ratio change at the time of employing one of the three kinds of diodes mentioned above as a rectifier circuit. The frequency of the carrier is 900 MHz and the transmission power is 1 W. The arrow of the vertical axis indicates the minimum power (34 µW) required by the terminal station. From FIG. 6, it is seen that the communication range becomes longer as the duty ratio is decreased and the peak value is increased. Even when the duty ratio is any of 1.0, 0.5, or 0.25, it is seen that a Schottky barrier diode can supply the power greater than the required minimum power, up to the longest distance. According to the example of FIG. 6, when the duty ratio is set to 0.25, and a Schottky barrier diode is employed, the above-mentioned minimum power can be supplied, to the position as far as about 40 m.

The present embodiment is especially suitable for using for a passive RFID system. In the RFID system, the demand of a passive tag system for long distances is expected from a viewpoint of environment, safety, and miniaturization. As described above, the technical problems of this system are that a sending station/receiving station antenna has the restrictions on a size, that the power transfer efficiency from a power sending station to a power receiving station is very low (about 10%), and especially that the efficiency of the rectifier circuit of high-frequency power is low. According to the present embodiment, the instantaneous peak value of high-frequency power is raised, keeping the transmission power constant by intermittently transmitting the electromagnetic waves transmitted from the sending station. Accordingly, communication can be performed, keeping the power transmitted by electromagnetic waves always greater than the threshold voltage of the diode possessed by RFID. Therefore, the above-described problem is solved, and the long-distance passive tag system which operates under the size restrictions can be provided, with high power transfer efficiency.

As described in the above, according to the present embodiment, in the wireless system which transmits a power using an electromagnetic wave signal radiated by a base station, the power transfer efficiency from a power sending station to a power receiving station can be optimized. That is, even when the distance of a base station and a terminal station separates greater than a marginal communication range (Lm) (which is a distance that a base station and a terminal station can communicate without intermittent operation of a transmission power from the base station) so that communication may be impossible under ordinary circumstances, a rectifier circuit possessed by the base station as a component can perform rectifying operation, with a transmission power not exceeding the limiting value specified in advance. Therefore, even if the communication range exceeds the above-mentioned marginal communication range (Lm), the base station can operate the micro-processor possessed by the terminal station as a component, effectively enabling the communication between the base station and the terminal station. As a result, it is effective in expanding the service area of the wireless system which includes the base station and the terminal station as components.

Second Embodiment

Figure 7:
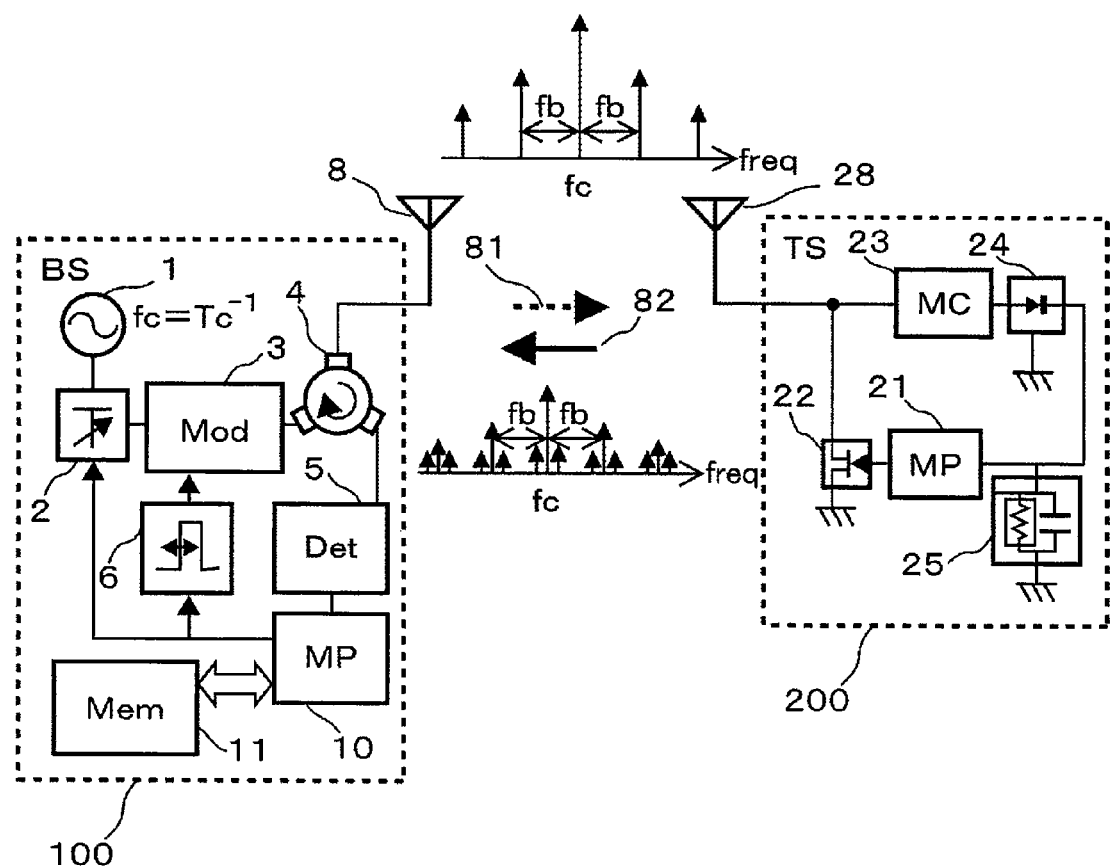
FIG. 7 is a block diagram illustrating a waveform-equalized intermittent transmission wireless system according to another embodiment of the present invention.

Another embodiment of the present invention is described with reference to FIG. 7. FIG. 7 is a block diagram illustrating a waveform-equalized intermittent transmission wireless system according to another embodiment of the present invention. The present embodiment illustrated in FIG. 7 is different from the embodiment of FIG. 1 in the following points. That is, the base station 100 further includes a micro-processor 10 and a memory 11. The output of the detector circuit 5 is inputted in the micro-processor 10. The micro-processor 10 is coupled to the external memory 11, and controls a variable attenuator 2 and a duty variable circuit 6.

In the present embodiment, the micro-processor 10 included in the base station is provided with a function to perform control of the variable attenuator and the duty variable circuit, with a more advanced and more sophisticated control parameter based on the information stored in the external memory 11 in advance, using the information on a sideband wave spectrum newly generated by the terminal station and detected by the detector circuit 5.

According to the present embodiment, in addition to the effect of the first embodiment, fine control of the mean power of the transmission power becomes attainable, and as a result, the power consumption of whole wireless system possessing the base station and the terminal station of the present embodiment can be effectively reduced.

Third Embodiment

Figure 8:
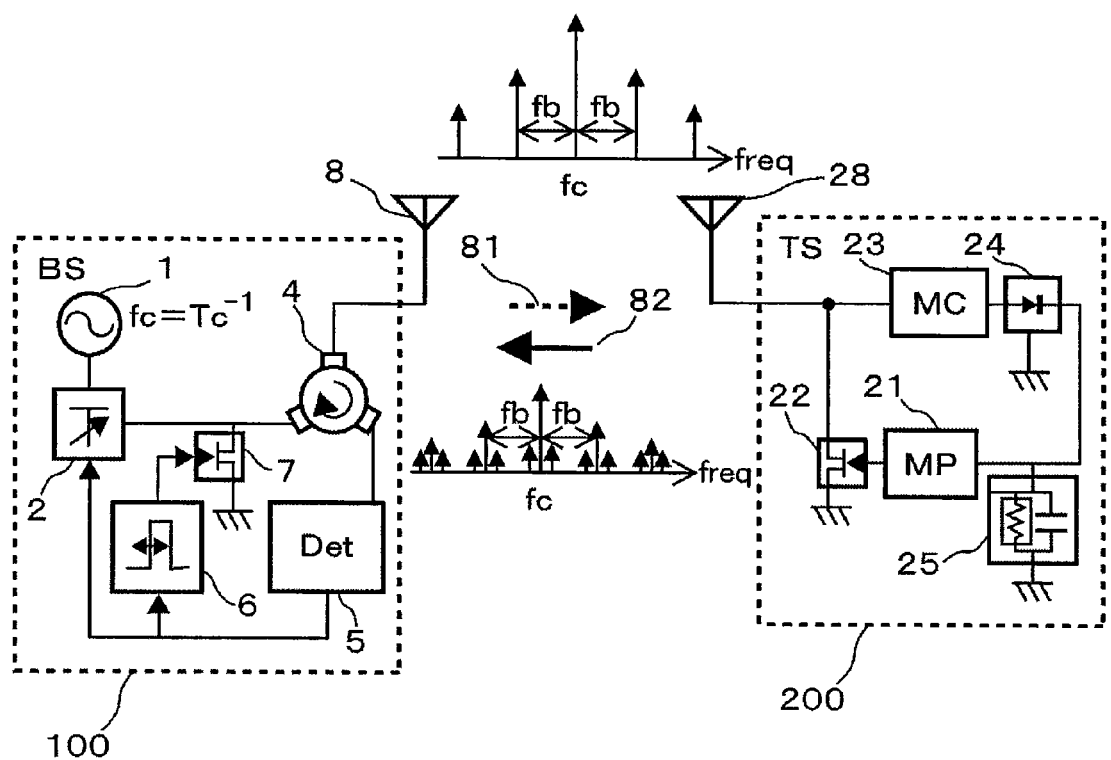
FIG. 8 is a block diagram illustrating a waveform-equalized intermittent transmission wireless system according to another embodiment of the present invention.

Another embodiment of the present invention is described with reference to FIG. 8. FIG. 8 is a block diagram illustrating a waveform-equalized intermittent transmission wireless system according to another embodiment of the present invention. What is different from the embodiment of FIG. 1 is that the modulation circuit is realized by a switch 7. According to the present embodiment, a modulation circuit is realizable by simple circuitry.

According to the present embodiment, in addition to the effect of the first embodiment, the miniaturization of the base station of the wireless system and production cost reduction can be effectively realized.

Fourth Embodiment

Figure 9:
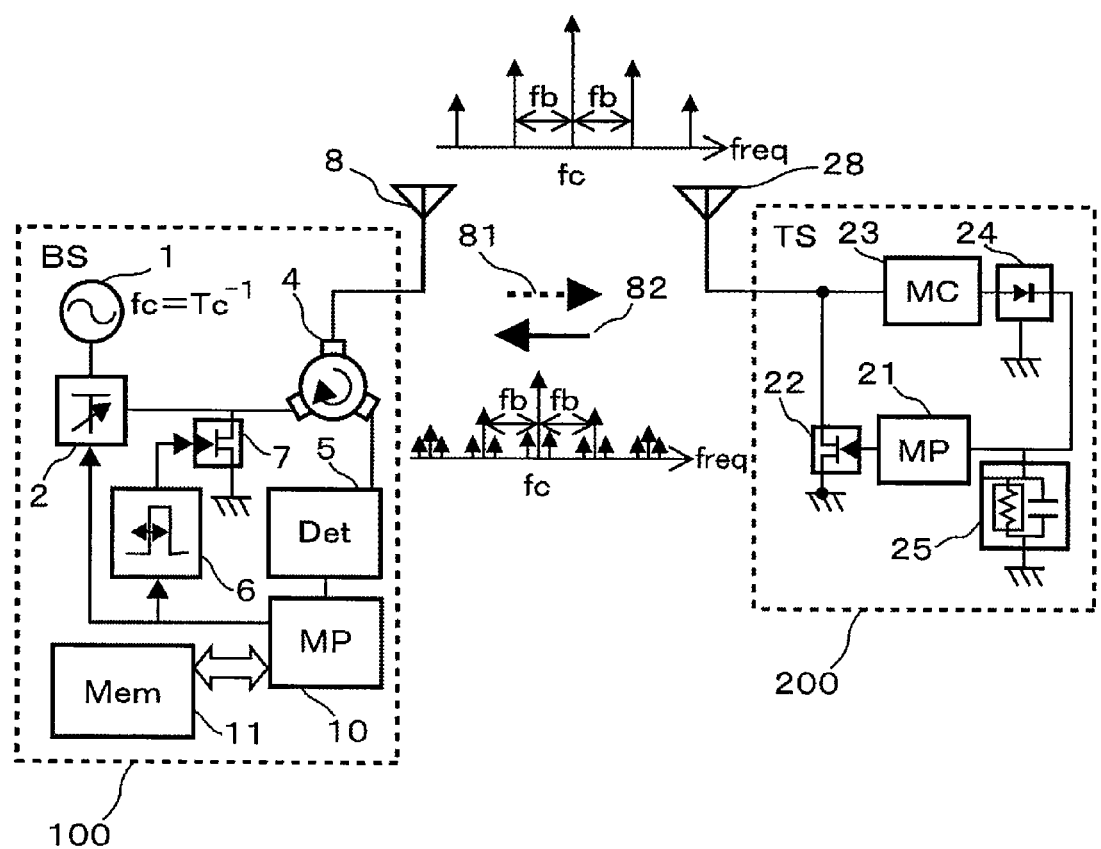
FIG. 9 is a block diagram illustrating a waveform-equalized intermittent transmission wireless system according to another embodiment of the present invention.

Another embodiment of the present invention is described with reference to FIG. 9. FIG. 9 is a block diagram illustrating a waveform-equalized intermittent transmission wireless system according to another embodiment of the present invention. What is different from the embodiment of FIG. 8 is as follows. The base station 100 includes a micro-processor 10 and a memory 11. The output of the detector circuit 5 is inputted in the micro-processor 10. The micro-processor 10 is coupled to the external memory 11, and controls a variable attenuator 2 and a duty variable circuit 6. The modulation circuit is realized by a switch 7. The effect of the present embodiment is the same as the effect of the second embodiment.

Fifth Embodiment

Figure 10:
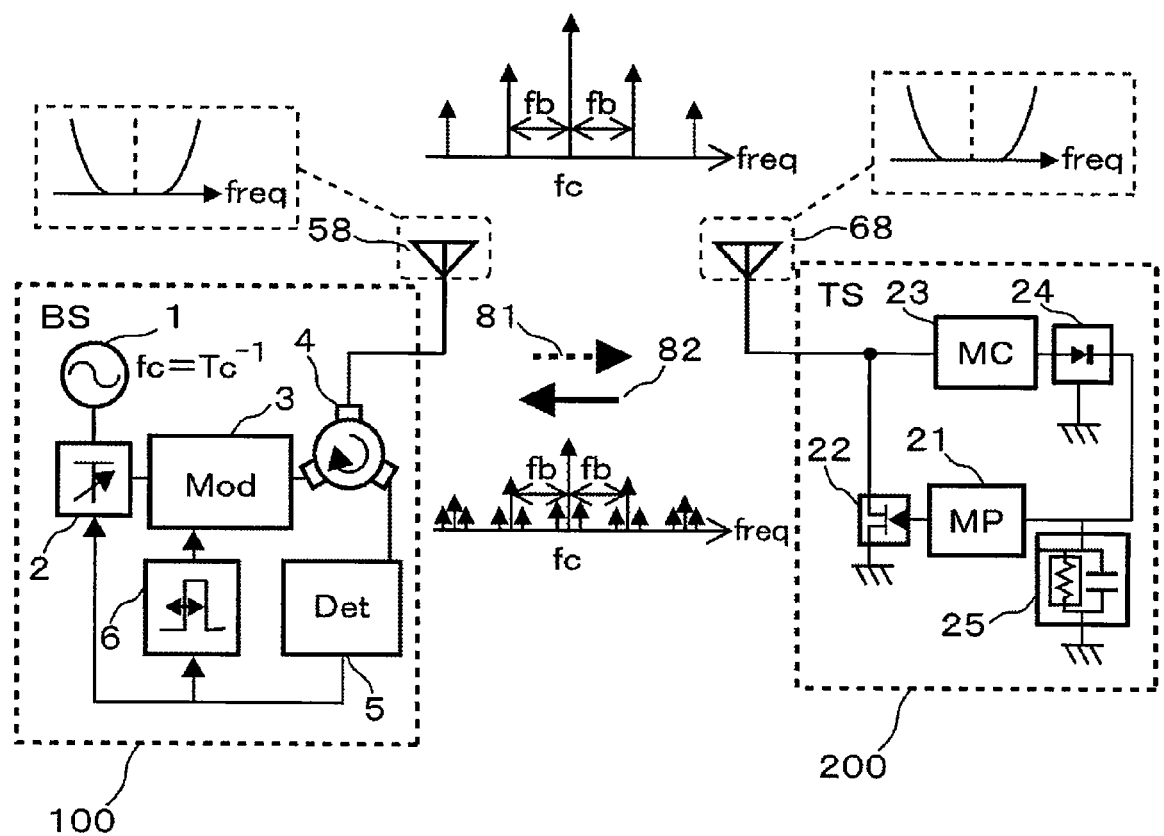
FIG. 10 is a block diagram illustrating a waveform-equalized intermittent transmission wireless system according to another embodiment of the present invention.

Another embodiment of the present invention is described with reference to FIG. 10. FIG. 10 is a block diagram illustrating a waveform-equalized intermittent transmission wireless system according to another embodiment of the present invention. In the present embodiment, a wideband base-station antenna 58 and a wideband terminal-station antenna 68 are adopted as the base-station antenna 8 and the terminal-station antenna 28, respectively. Other constitution is the same as the embodiment of FIG. 1.

The transmission power 81 transmitted from the base station to the terminal station and the reflected wave 82 transmitted from the terminal station to the base station have a spectrum with a wide spread in the frequency domain. Therefore, according to the present embodiment, the transfer of power from the base station to the terminal station and from the terminal station to the base station can be made efficiently, without losing a specific frequency component. Consequently, it is effective in reducing the power consumption of the wireless system which includes the base station and the terminal station as components, and allows the distance between the base station and the terminal station to be taken long. Therefore, the service area of the wireless system can be effectively expanded.

Sixth Embodiment

Figure 11:
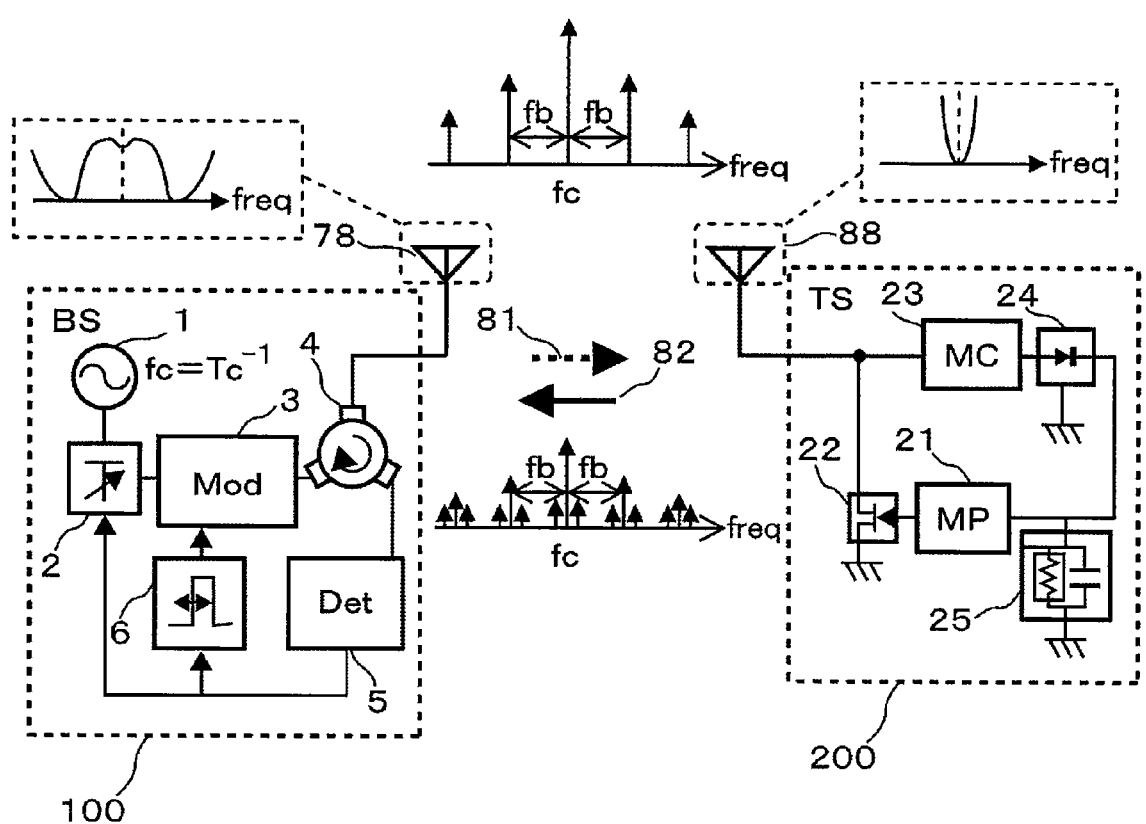
FIG. 11 is a block diagram illustrating a waveform-equalized intermittent transmission wireless system according to another embodiment of the present invention.

Another embodiment of the present invention is described with reference to FIG. 11. FIG. 11 is a block diagram illustrating a waveform-equalized intermittent transmission wireless system according to another embodiment of the present invention. What is different from the embodiment of FIG. 1 is that the base-station antenna 8 and the terminal-station antenna 28 are replaced with an equalizing base-station antenna 78 and a narrow-band terminal-station antenna 88, respectively.

Since the transmission power 81 transmitted from the base station to the terminal station and the reflected wave 82 transmitted from the terminal station to the base station have a spectrum with a wide spread in the frequency domain, the electromagnetic waves inputted into the terminal station from the terminal-station antenna will suffer distortion at frequencies other than the center frequency.

According to the present embodiment, a transmitted wave from the base station to the terminal station is transmitted by the equalizing base-station antenna which produces in advance a distortion of an inverse characteristic to a distortion that the terminal-station antenna produces. The antenna which possesses such an equalization function can be found by supposing a suitable region and dividing into sufficiently small regions as compared with a wavelength (less than $\frac{1}{100}$ wavelength), and examining fully all combinations of every small regions where a conductor exists. Accordingly, as a result, the transfer of power from the base station to the terminal station and from the terminal station to the base station is made efficiently, without lacking a specific frequency component; therefore, the same effect as in the fifth embodiment is realizable.

Seventh Embodiment

Figure 12:
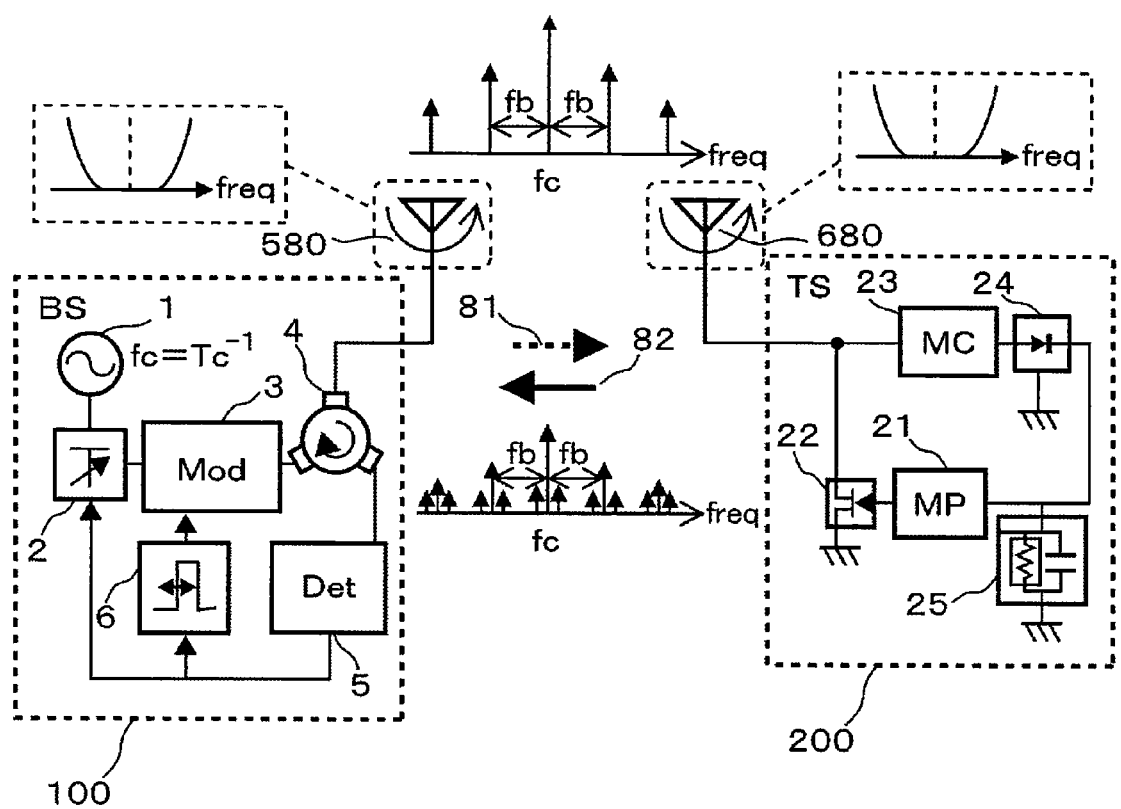
FIG. 12 is a block diagram illustrating a waveform-equalized intermittent transmission wireless system according to another embodiment of the present invention.

Another embodiment of the present invention is described with reference to FIG. 12. FIG. 12 is a block diagram illustrating a waveform-equalized intermittent transmission wireless system according to another embodiment of the present invention. What is different from the embodiment of FIG. 10 is that the wideband base-station antenna 58 and the wideband terminal-station antenna 68 are respectively replaced with a wideband circularly-polarized-wave base-station antenna 580 and a wideband circularly-polarized-wave terminal-station antenna 680.

An electromagnetic wave of circular polarization reverses the direction of rotation of the polarization whenever reflected by an object. In principle, a circularly polarized wave antenna possesses sensitivity only in the circularly polarized wave of one direction of rotation. On the other hand, when electromagnetic waves are compounded through several different arrival paths, the electromagnetic waves will present the phenomenon of changing the intensity irregularly called fading. Since the communication range between the base station and the terminal station is determined when the intensity of electromagnetic waves has become weakest under the fading environment, the communication range between the base station and the terminal station is expandable by suppressing this fading.

According to the present embodiment, since the base station and the terminal station use the circularly-polarized-wave antennas, the wireless system, including the base station and the terminal station of the present embodiment as components, can reduce influence of a reflected wave which might be generated when an electromagnetic wave scattering object exists in the environment where the wireless system operates. Consequently, the distance between the base station and the terminal station can be taken longer, leading to an effective expansion in the service area of the wireless system.

Eighth Embodiment

Figure 13:
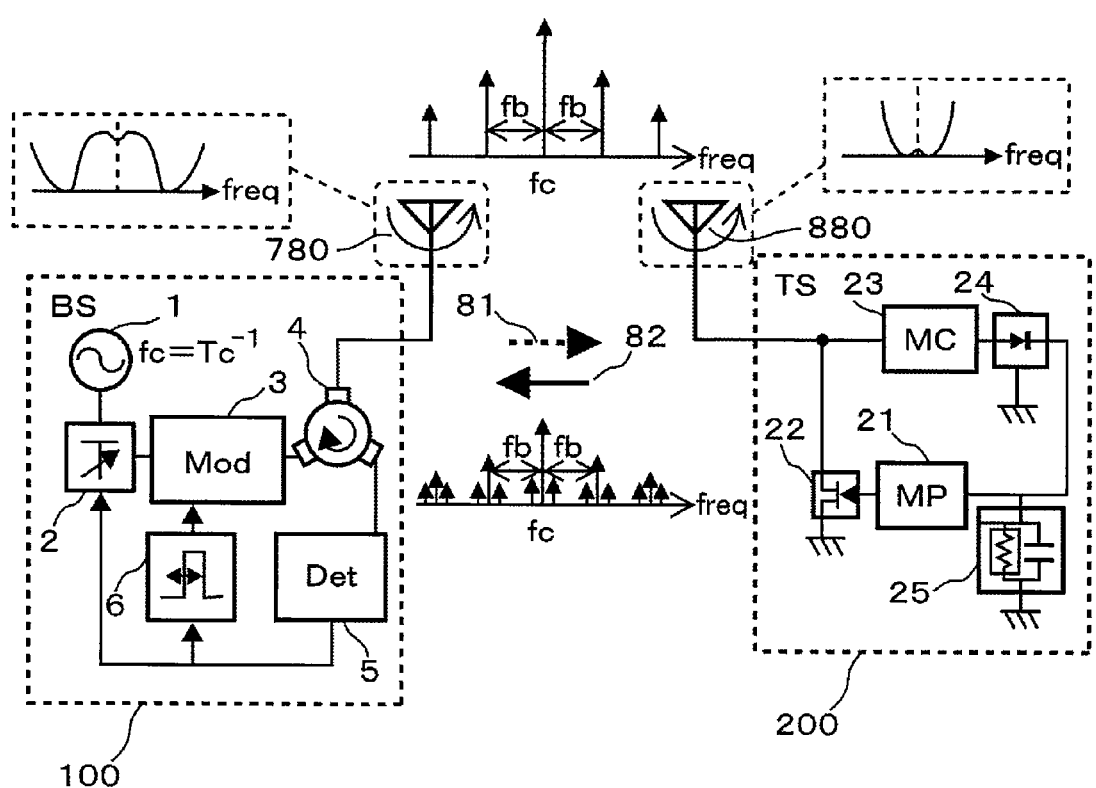
FIG. 13 is a block diagram illustrating a waveform-equalized intermittent transmission wireless system according to another embodiment of the present invention.

Another embodiment of the present invention is described with reference to FIG. 13. FIG. 13 is a block diagram illustrating a waveform-equalized intermittent transmission wireless system according to another embodiment of the present invention. What is different from the embodiment of FIG. 11 is that the equalizing base-station antenna 78 and the narrow-band terminal-station antennas 88 are respectively replaced with an equalizing circularly-polarized-wave base-station antenna 780 and a narrow-band circularly-polarized-wave terminal-station antenna 880. The present embodiment has the same effect as the seventh embodiment.

Ninth Embodiment

Figure 14:
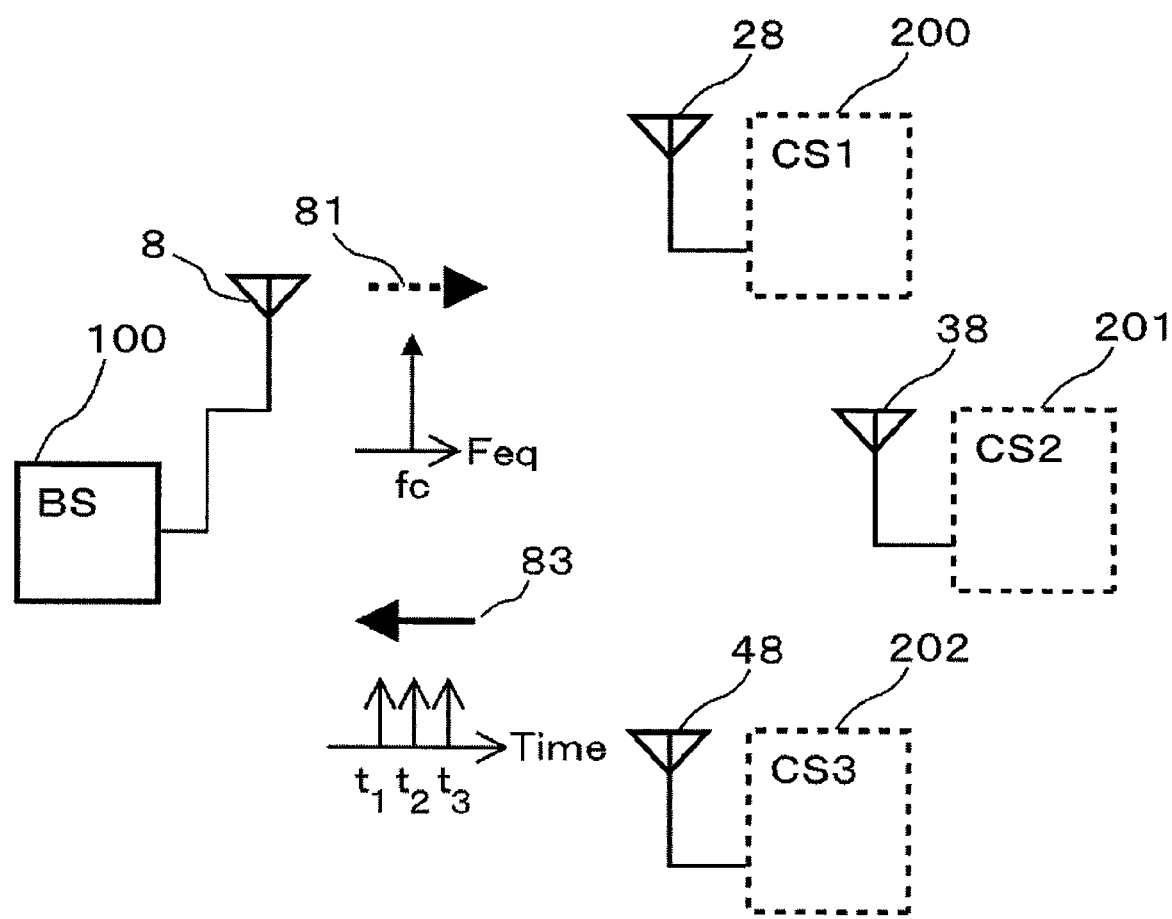
FIG. 14 is a block diagram illustrating a waveform-equalized intermittent transmission wireless system possessing plural terminal stations according to another embodiment of the present invention.

Another embodiment of the present invention is described with reference to FIG. 14. FIG. 14 is a block diagram illustrating a waveform-equalized intermittent transmission wireless system possessing one base station and plural terminal stations according to another embodiment of the present invention. In FIG. 14, three terminal stations exist and the base station needs to recognize each of three terminal stations.

A base station 100 possesses an antenna 8 and terminal stations 200, 201, and 202 possess antennas 28, 38, and 48, respectively. Three terminal stations communicate with one base station 100 using radiation fields 81 and 83. It is assumed that each terminal station transmits the on-off pattern of changeover switching at a chronologically different timing corresponding to the contents of the memory possessed by each terminal station. According to the scheme described above, it becomes possible to shift the transmission timing of the scattered electromagnetic wave from the antennas 28, 38, and 48 in a certain period, allowing the base station to identify three terminal stations by detecting the timing.

In FIG. 14, an arrow 81 indicates the spectrum of electromagnetic waves radiated from the base station, and an arrow 83 indicates chronologically the timing at which the modulation indicative of the intrinsic information is performed for some part of the electromagnetic waves reflected by three terminal stations.

According to the present embodiment, since the base station can identify plural terminal stations, it is effective in increasing the channel capacity of the waveform-equalized intermittent transmission wireless system.

Tenth Embodiment

The application of the wireless system of the present invention is not limited to the RFID systems according to the embodiments described above, and it is needless to say that the present invention is applicable to the wireless system at large which performs the intermittent transmission of power wirelessly.

Figure 15:
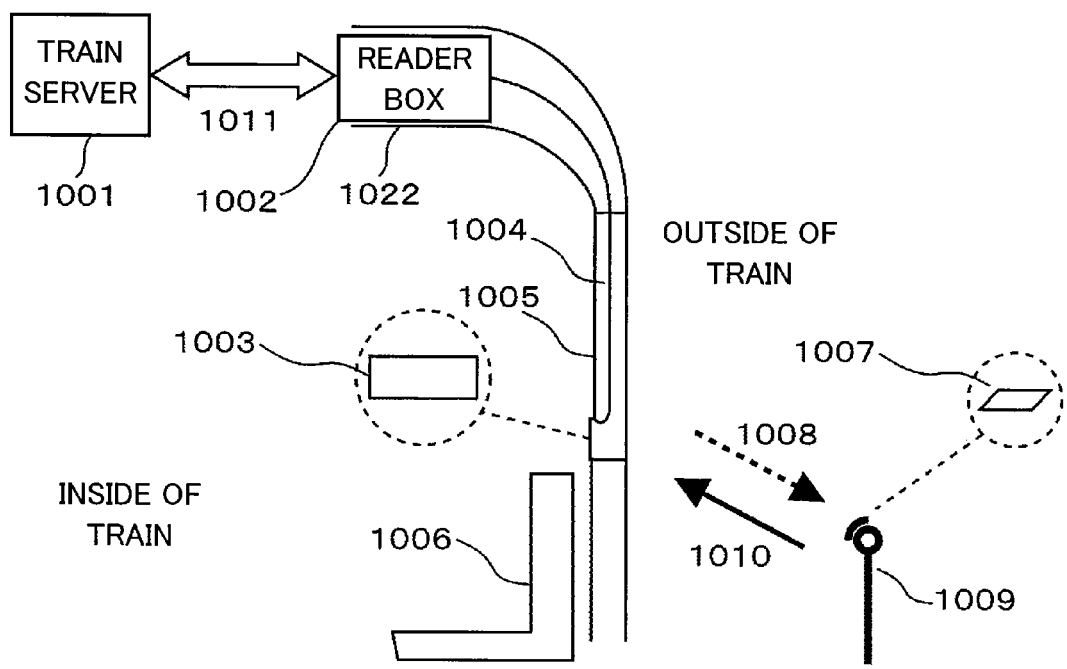
FIG. 15 is an explanatory drawing of a business model which adopts a waveform-equalized intermittent transmission wireless system according to another embodiment of the present invention.
Figure 16:
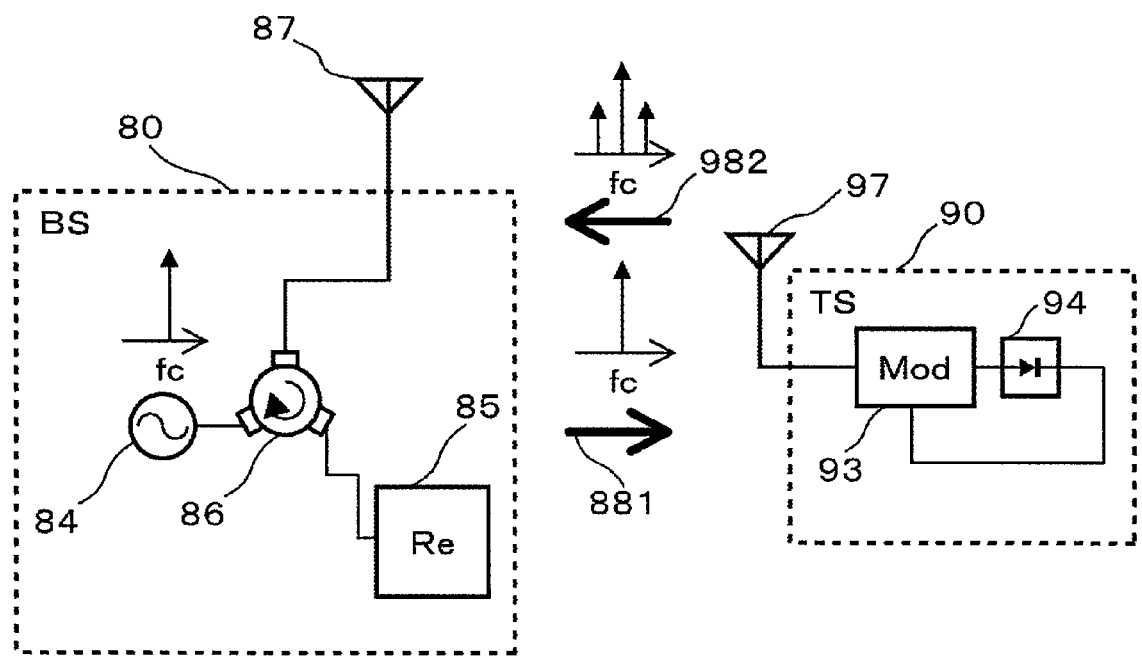
FIG. 16 is a block diagram illustrating a direction division duplex wireless communication system according to the conventional technology.

Another embodiment of the present invention, in which an intermittent transmission of power is performed between a base station and a terminal station, will be explained with reference to FIG. 15. FIG. 15 is a drawing illustrating a business model which adopts a waveform-equalized intermittent transmission wireless system according to one embodiment of the present invention.

A base station 1002 is installed inside a train, and a terminal station 1007 is installed outside the train. A base-station antenna 1003 is stuck on the upper back of a chair 1006 beside a windowpane 1005, and coupled with the base station 1002 through a high-frequency cable 1004 installed inside a ceiling 1022. The base station 1002 is coupled with a server 1001 installed suitably somewhere in the train through a wired network 1011. A terminal station 1007 stuck on an upper part of a safeguard 1009 outside the train receives transmission power 1008 transmitted from the base-station antenna 1003, and transmits to the base-station antenna 1003 a reflected wave 1010 including certain information.

The ID of the safeguard is recorded on the terminal station 1007 in advance. The base station 1002 receives this ID as information from the terminal station 1007, and sends it to the server 1001. The matching information of the ID and map information is recorded on the server 1001 in advance. The server can provide users, such as a driver, a conductor, and a passenger, with the position of the train on display means using a suitable man-machine interface.

According to the present embodiment, it is effective to provide a user with appropriate position information with the easy constitution using the wireless system.

What is claimed is:

1. A wireless system comprising:
a base station and a terminal station,
wherein the base station comprises
a modulator which modulates a carrier to produce a modulated carrier;
a signal generator which generates an output signal possessing an average transmission power not greater than a predetermined value by controlling a peak value and a duty ratio of the modulated carrier simultaneously;
a transmitting unit which transmits the output signal generated; and
a controller which controls the peak value and the duty ratio, in terms of a power of a reflected wave which is generated when the transmission power transmitted by the base station is reradiated by the terminal station;
wherein both data transmission and power transmission between the base station and the terminal station are performed using a same carrier waveform,
wherein the controller controls the peak value of the transmission output received by the terminal station to constantly exceed a threshold value of a rectifying element of the terminal station,
wherein the wireless system employs an electromagnetic wave propagating space as a communication medium, and performs a waveform-equalized intermittent transmission between the base station and the terminal station, wherein the controller controls the peak value and the duty ratio using a frequency spectrum of an electromagnetic wave which is reradiated from the terminal station, and of which the reradiated frequency spectrum possesses a frequency component not included in a frequency spectrum of the transmission power of the base station, wherein the base station further comprises a detector configured to detect the reradiated frequency spectrum of the electromagnetic wave from the terminal station, and of which the reradiated frequency spectrum possesses a frequency component not included in the frequency spectrum of transmission power of the base station, wherein the controller increases the peak value of the transmission power and decreases the duty ratio of the intermittent transmission, when the frequency spectrum is not detected, if an average power value of the transmission power remains within a predetermined value range, wherein the wireless system further comprises an equalizing base station antenna and a terminal station antenna, and wherein a transmitted wave from the base station to the terminal station is transmitted by the equalizing base station antenna which produces, in advance, a distortion of an inverse characteristic to a distortion that the terminal station antenna produces.

2. The wireless system according to claim 1,
wherein the terminal station comprises a modulator which modulates the transmission power to be radiated by the base station.

3. The wireless system according to claim 1,
wherein the controller decreases the peak value of the transmission power and increases the duty ratio of intermittent transmission, when the frequency spectrum is detected, if an average power value of the transmission power remains within a predetermined value range.

4. The wireless system according to claim 1,
wherein the terminal station comprises a rectifier circuit including the rectifying element, and wherein the terminal station further comprises a receiver which receives, from a terminal station antenna, the transmission power transmitted by the base station, rectifies with the rectifier circuit a high frequency power which is an actual aspect of the transmission power, and uses the rectified high frequency power as a power source for an electronic circuit which composes the terminal station.

5. The wireless system according to claim 4,
wherein the rectifying element is a Schottky barrier diode.

6. The wireless system according to claim 1,
wherein the equalizing base station antenna and the terminal station antenna are in the form of a wideband antenna.

7. The wireless system according to claim 6,
wherein the equalizing base station antenna and the terminal station antenna are in the form of a circularly-polarized-wave antenna.

8. The wireless system according to claim 1,
wherein the terminal station antenna is a resonance type antenna.

9. The wireless system according to claim 1,
wherein the terminal station comprises a rectifier circuit including a diode, and wherein the controller maintains the transmission power of the base station below a fixed value, thereby allowing a voltage to be applied to the diode which is always in excess of a threshold voltage of the diode, and such that energy is exchanged between the base station and the terminal station below a limit power.

* * * * *